E. G. MISSBACH.
SYSTEM OF ELECTRICAL SIGNALING.
APPLICATION FILED JULY 18, 1912.
1,126,826.
Patented Feb. 2, 1915.
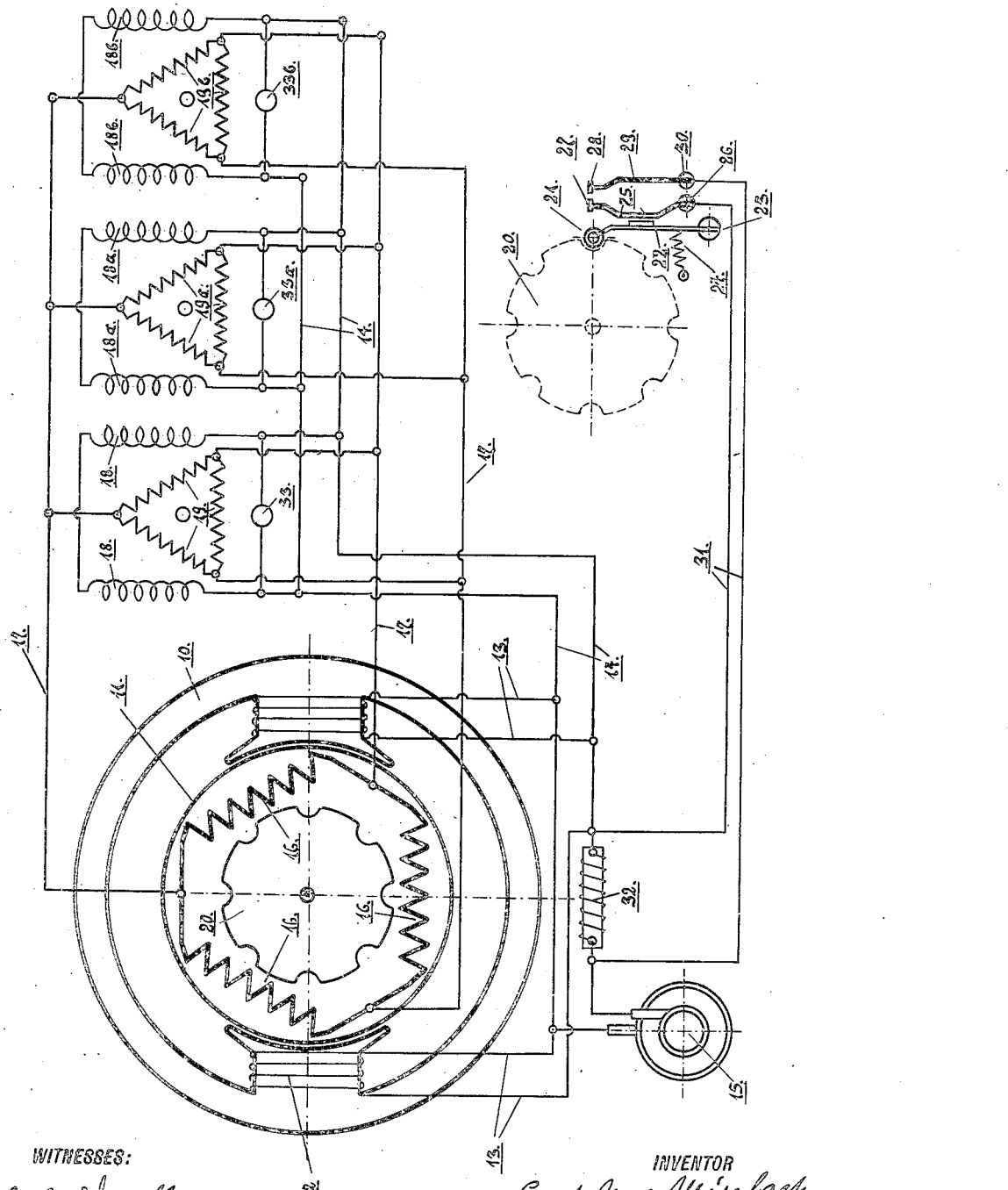
WITNESSES:
INVENTOR
Ernst Georg Missbach
BY
his ATTORNEYS

UNITED STATES PATENT OFFICE.

ERNST GEORG MISSBACH, OF NEW YORK, N. Y., ASSIGNOR TO SIEMENS & HALSKE, AKTIENGESELLSCHAFT, OF BERLIN, GERMANY, A CORPORATION OF GERMANY.

SYSTEM OF ELECTRICAL SIGNALING.

1,126,826.  Specification of Letters Patent.  Patented Feb. 2, 1915.

Application filed July 18, 1912. Serial No. 710,185.

*To all whom it may concern:*

Be it known that I, ERNST GEORG MISSBACH, a subject of the German Emperor, residing in the borough of Manhattan, city, county, and State of New York, have invented certain new and useful Improvements in Systems of Electrical Signaling, of which the following is a full and clear specification.

This invention relates to an electric signaling system and more particularly to a system of this kind, by which the angular position of a sending element will be enabled to be transmitted upon a receiving element or a plurality of receiving elements.

For my present system of electric signaling I propose to use between the sending and the receiving station a system of electric power transmission which consists essentially of a synchronous generator at the sending station and a similar synchronous motor at the receiving station, whereby equality of the angular positions between motor and generator, that is to say synchronism, will be maintained by the electrical connections between these two elements and whereby further a rotation of any of these elements by mere action of electric currents from the current source will be prevented. I therefore employ an excitation of such character for this generator or sending element and for this motor or receiving element, that the action of the excitation current alone will be unable to move any element from its position of rest, but maintain synchronism in every instance, at rest and during motion, between the sending and the receiving elements.

For the excitation of this generator and this motor which represent the sending and receiving elements of my present system respectively, I supply single phase alternating current to one member of said generator and said motor, and employ a plurality of phase-displaced circuits for the other member of said generator and said motor, said phase-displaced circuits of said generator-element being closed upon the corresponding phase-displaced circuits of said motor element. In this manner I secure the characteristics of the single phase synchronous or induction motor of not being able to start from rest and thus avoid constant rotation of the motor element or of the generator element of my present system.

My invention further comprises improvements of the above system of electric signaling.

One improvement which forms part of my invention consists therein, that I provide means for preventing a receiving element, when in a wrong position, from reacting as generator or sending element upon the other motor or receiving element. A wrong position of a receiving element may, for instance, be caused by a surplus of friction, and for avoiding in this case a reaction, I employ armature windings of a relatively high ohmic or inductive resistance. In addition to this, I reduce the possible interfering action by reducing the size of the receiving elements relatively to the size of the sending element, or in other words, I employ a relatively large sending element and relatively small receiving elements. Another result of the smallness of the receiving elements is, that the tendency of the latter to oscillate will be suppressed on account of the smaller momentum of inertia.

By providing high resistance in the receiving armature, however, the moving force of this armature will apparently be rendered smaller, and in order to prevent the receiving armature from eventually remaining at rest upon motion of the sending element, I provide additional means whereby at instances of signaling,—that is to say, at an instant when the position of the sending element is changed,—the moving force of the receiving armature will be increased. For this purpose I prefer to use a choke-coil which is normally inserted into the field circuit of the system and which is short-circuited at times of motion of the sending armature. When the signaling system is inoperative, all armatures will thus be subject to a smaller field strength, and consume only an amount of current which is sufficient to maintain the proper angular position of the receiving elements relatively to the sending element, while at times of giving signals, the field strength of the system and thereby the moving force of the receiving elements will be increased, to secure positive motion of the latter.

A further object of my invention is to employ an indicating means which comes automatically into operation at times of signaling for indicating to the attendant the fact that a signal has been given.

My invention will be more fully understood by reference to the accompanying drawing which shows in a diagrammatic view the arrangement of a signaling system according to the present invention.

Referring more particularly to the drawing, 10 represents the bi-polar field structure of the sending element and 11 the armature of the sending element.

12 are the field coils which are mounted upon pole bodies of the field structure of the sending element, said field coils being connected by conductor 13 with the mains 14 of a single phase alternating current source 15. The armature 11 of the sending element contains a plurality of phase-displaced windings 16, which are evenly distributed over the circumference of the armature. I have shown a three-phase arrangement of these windings, although any plurality of phases may be employed. These armature windings of the sending element are constructed with a comparatively low resistance and are connected by conductors 17 to the corresponding armatures of the receiving elements. I have shown three receiving elements of which the first consists of a field 18 and an armature 19, similar to the sending element. The corresponding devices of the two other receiving elements are designated by the same numbers as those of the first receiving element with the addition of the indexes "a" and "b" respectively.

The armatures 19, 19ª and 19ᵇ of the receiving elements contain windings which are of a resistance which is several times that of the sending armature for the above reason. The means for increasing the field strength of the system at times of signaling consist of a contact device comprising a toothed wheel 20 which is mounted upon the shaft of the armature 11 of the sending element, said toothed wheel 20 coöperating with a roller 21 mounted at the upper end of a lever 22 which is pivoted at 23. This lever 22 and the roller 21 are pressed against the depressions of the toothed disk 20 by means of a spring 24, and secure, therefore, a locking tendency of the sending element in a plurality of angular positions. A further spring 25 is fixed at its lower end to a post 26 and carries at its upper end a contact member 27 which is preferably made of platinum. Opposite to this contact member 27 there is mounted a further contact member 28, also preferably made of platinum, forming the upper end of the spring 29 which is fixed to a post 30. From the posts 30 and 26, conductors 31 lead to the terminals of a choke-coil 32, which is inserted into one of the mains of the alternating current source 15 in a manner that said choke-coil will be included in circuit with said alternating current source 15 and each of the field windings of the sending element and of the receiving elements. In parallel to the field windings 18, 18ª and 18ᵇ of the receiving elements, lamps 33, 33ª and 33ᵇ are inserted, as clearly indicated in the drawing.

If it is desired to transmit signals from the sending element upon each of the receiving elements the armature 11 is rotated by the operator. At every instant when this armature passes a predetermined angular position, in the case as shown in the drawing, positions which are spaced from each other by one eighth of the circumference, a contact will be made by means of the contact apparatus above described, said contact short-circuiting the choke-coil 32 momentarily with the passage of the sending armature through each of said angular positions. Therefore whenever the position of the sending armature is changed for giving a signal, the field strength of each of the sending and receiving elements will momentarily be increased and secure positive motion of the receiving elements and at the same time the lamps 33, 33ª and 33ᵇ will momentarily light up and thereby indicate that a signal has been given.

Having thus described my new invention, I do not wish to be understood as confining myself to the precise constructions as shown and described herein since modifications may be made thereon without departing from the principles or sacrificing any of the advantages of this invention.

What I claim is:

1. In an electric signaling system of the character described, the combination of a relatively large sending element, with a plurality of relatively small electrically retained and operated receiving elements a circuit connecting the sending element with the receiving elements, the relative size of said elements being such as to prevent a receiving element when in a wrong position from reacting upon the other receiving elements, means for normally retaining said sending element in a desired plurality of angular positions, and automatic means for temporarily increasing the operating current for said elements at the instant when said sending element is moved from one into another position.

2. In an electric signaling system of the character described, the combination of a sending element of relatively large size and having an armature of relatively low resistance, with a plurality of receiving elements of relatively small size and each having an armature of relatively high resistance, a circuit connecting said transmitter and receivers, the size and resistance of said receiving elements relatively to the size and resistance of said sending element being such as to prevent a receiving element when in a wrong position from reacting upon the other receiving elements, means for normally retaining said sending element in a desired plurality of angular positions, and automatic means for temporarily increasing the operating current for said elements at the instant when said sending element is moved from one into another position.

3. In an electric signaling system of the character described, the combination of a relatively large sending element, a plurality of relatively small electrically retained and operated receiving elements a circuit connecting the sending element with the receiving elements, the relative size of said elements being such as to prevent a receiving element when in a wrong position from reacting upon the others, means for normally retaining said sending element in a desired plurality of angular positions, automatic means for temporarily increasing the field strength of said elements at the instant when said sending element is moved from one into another position, and a device for indicating said instances of signaling by said increase of operating current.

4. In an electric signaling system of the character described, the combination of a sending element having an armature of relatively low resistance, with a plurality of receiving elements each having an armature of relatively high resistance, a circuit connecting said transmitter and receivers the resistances of said receiving elements relative to the resistances of said sending element being such as to prevent a receiving element when in a wrong position from reacting upon the others, means for normally retaining said sending element in a desired plurality of angular positions, and automatic means for temporarily increasing the operating current for said elements at the instant when said sending element is moved from one into another position.

5. In an electric signaling system of the character described, the combination of a sending element of relatively large size and having an armature of relatively low resistance, with a plurality of receiving elements of relatively small size and each having an armature of relatively high resistance, a circuit connecting said transmitter and receivers the size and resistance of said receiving elements relatively to the size and resistance of said sending element being such as to prevent a receiving element when in a wrong position from reacting upon the others, means for normally retaining said sending element in a desired plurality of angular positions, automatic means for temporarily increasing the operating current for said elements at the instant when said sending element is moved from one into another position, and a device for indicating said instances of signaling by said increase of operating current.

In testimony whereof I have hereunto set my signature in presence of two subscribing witnesses.

ERNST GEORG MISSBACH.

Witnesses:
 WM. A. COURTLAND,
 H. ALFRED JANKE.